US012012553B2

(12) United States Patent
Allegro, II et al.

(10) Patent No.: US 12,012,553 B2
(45) Date of Patent: Jun. 18, 2024

(54) CONVERSION OF PLASTICS TO MONOMERS WITH INTEGRATED RECOVERY WITH A CRACKING UNIT

(71) Applicant: UOP LLC, Des Plaines, IL (US)

(72) Inventors: Michael S. Allegro, II, Wood Dale, IL (US); Andrea Bozzano, Northbrook, IL (US); Joseph A. Montalbano, Elmhurst, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/360,657

(22) Filed: Jun. 28, 2021

(65) Prior Publication Data

US 2022/0010211 A1 Jan. 13, 2022

Related U.S. Application Data

(60) Provisional application No. 63/050,791, filed on Jul. 11, 2020.

(51) Int. Cl.
| | | |
|---|---|---|
| *C10B 53/07* | (2006.01) | |
| *C08J 11/12* | (2006.01) | |
| *C10G 11/20* | (2006.01) | |
| *C10G 31/06* | (2006.01) | |

(52) U.S. Cl.
CPC ............... *C10B 53/07* (2013.01); *C08J 11/12* (2013.01); *C10G 11/20* (2013.01); *C10G 31/06* (2013.01); *C10G 2300/1003* (2013.01); *C10G 2400/20* (2013.01)

(58) Field of Classification Search
None
See application file for complete search history.

(56) References Cited

U.S. PATENT DOCUMENTS

| 5,216,149 A | 6/1993 | Evans et al. |
| 5,731,483 A | 3/1998 | Stabel et al. |
| 2003/0047437 A1* | 3/2003 | Stankevitch ............. C10G 1/10 201/25 |
| 2016/0362609 A1* | 12/2016 | Ward ..................... C10G 69/02 |
| 2022/0220389 A1* | 7/2022 | Slivensky .............. G06Q 10/30 |

FOREIGN PATENT DOCUMENTS

| JP | 2000191825 A | 7/2000 |
| JP | 2003267896 A | 9/2003 |
| JP | 2019527758 A | 10/2019 |
| WO | 2012099677 A3 | 7/2012 |

OTHER PUBLICATIONS

PCT/US2021-070824—Written Opinion and Search Report, date of mailing Sep. 30, 2021.
Office Action for corresponding Japanese Application No. 2023-501677 dated Feb. 7, 2024 (translation).

\* cited by examiner

*Primary Examiner* — Youngsul Jeong
(74) *Attorney, Agent, or Firm* — Paschall & Associates, LLC; James C. Paschall

(57) ABSTRACT

A plastic pyrolysis process produces light olefin product and heavier products. The light olefin products are separated in a recovery process while the heavier product can be sent to a cracking unit to be further cracked to desired products. The cracked effluent stream may be subjected to the recovery process along with the light olefin product.

15 Claims, 3 Drawing Sheets

CONVERSION OF PLASTICS TO MONOMERS WITH INTEGRATED RECOVERY WITH A CRACKING UNIT

CROSS-REFERENCE TO RELATED APPLICATIONS

This application claims priority from U.S. Provisional Application No. 63/050,791, filed Jul. 11, 2020, which is incorporated herein in its entirety.

FIELD

The field is the recycling of plastic materials to produce monomers.

BACKGROUND

The recovery and recycle of waste plastics is held with deep interest by the general public which has been participating in the front end of the process for decades. Past plastic recycling paradigms can be described as mechanical recycling. Mechanical recycling entails sorting, washing and melting recyclable plastic articles to molten plastic materials to be remolded into a new clean article. However, this mechanical recycling process has not proven economical. The melt and remolding paradigm has encountered several limitations, including economic and qualitative. Collection of recyclable plastic articles at materials recovery facilities inevitably includes non-plastic articles that had to be separated from the recyclable plastic articles. Similarly, collected articles of different plastics have to be separated from each other before undergoing melting because the articles molded of different plastics would not typically have the quality of an article molded of the same plastic. Separation of collected plastic articles from non-plastic articles and then into the same plastics added expense to the process that made it less economical. Additionally, recyclable plastic articles have to be properly cleaned to remove non-plastic residues before melting and remolding which also added to the expense of the process. The recovered plastic also does not possess the quality of virgin grade resins. The burdensome economics of the plastic recycling process and the lower quality of recycled plastic have prevented widespread renewal of this renewable resource.

A paradigm shift has enabled the chemical industry to rapidly respond with new chemical recycling processes for recycling waste plastics. The new paradigm is to chemically convert the recyclable plastics in a pyrolysis process operated at about 350 to 600° C. to liquids. The liquids can be refined in a refinery to fuels, petrochemicals and even monomers that can be re-polymerized to make virgin plastic resins. The pyrolysis process still requires separation of collected non-plastic materials from plastic materials fed to the process, but cleaning and perhaps sorting of plastic materials may not be as critical in chemical recycling.

Higher temperature pyrolysis is under investigation and is viewed as a route to convert plastics directly to monomers without further refining. Conversion of plastics back to monomers presents a circular way of recycling a renewable resource that as of yet has not been fully economically developed. What is needed is a viable process to convert plastic articles directly back to monomers.

BRIEF SUMMARY

This disclosure describes plastic pyrolysis process that produces light olefin product and heavier products. The light olefin products are separated in a recovery process while the heavier product can be sent to a cracking unit to be further cracked to desired products. The cracked effluent stream may be subjected to the recovery process along with the light olefin product.

DEFINITIONS

Figure 1:
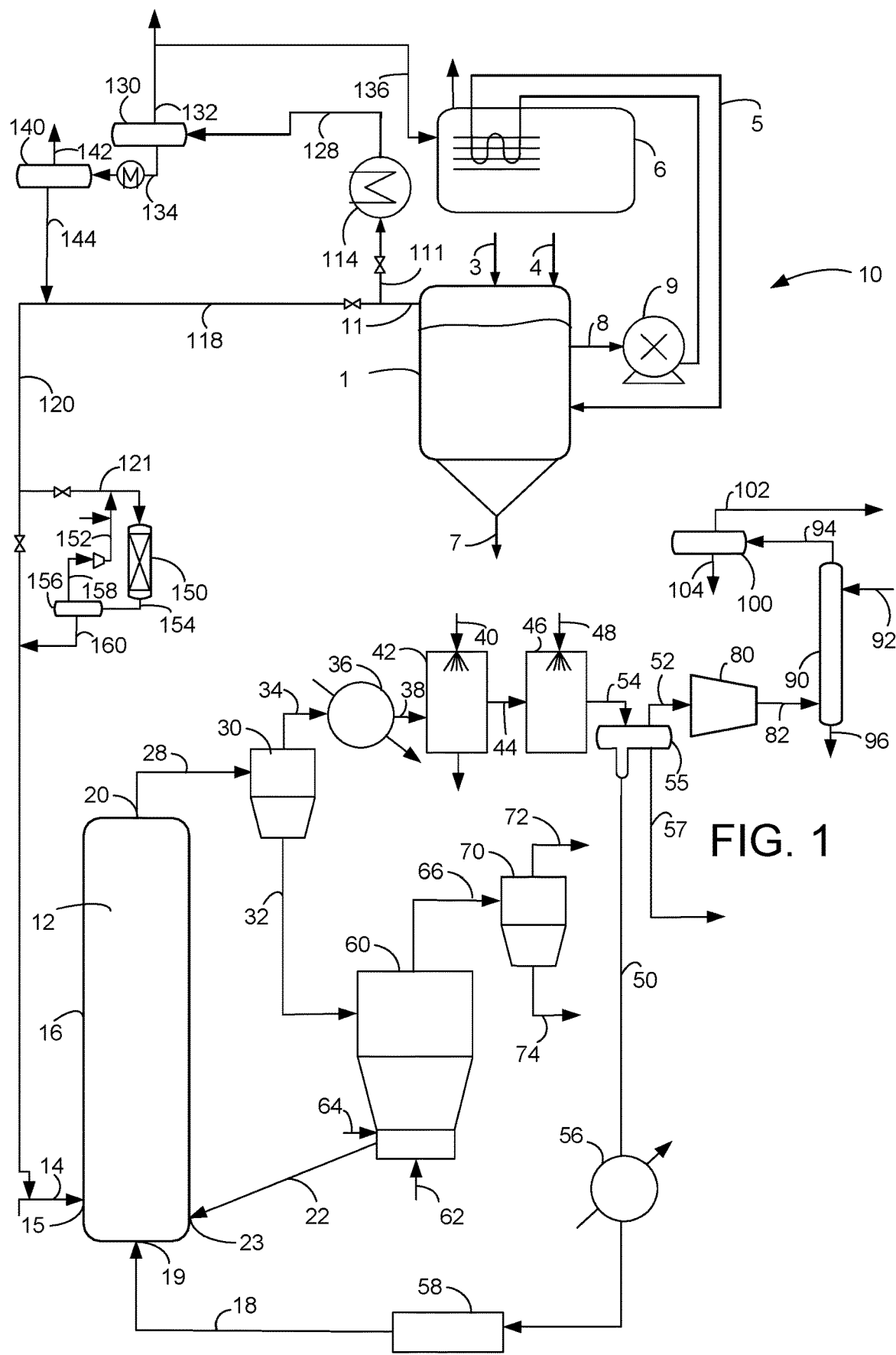
FIG. 1 is a schematic drawing of a process and apparatus of the present disclosure.

The term "communication" means that fluid flow is operatively permitted between enumerated components, which may be characterized as "fluid communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "bypass" means that the object is out of downstream communication with a bypassing subject at least to the extent of bypassing.

The term "predominant", "predominance" or "predominate" means greater than 50%, suitably greater than 75% and preferably greater than 90%.

The term "carbon-to-gas mole ratio" means the ratio of mole rate of carbon atoms in the plastic feed stream to the mole rate of gas in the diluent gas stream. For a batch process, the carbon-to-gas mole ratio is the ratio of moles of carbon atoms in the plastic in the reactor to the moles of gas added to the reactor.

DETAILED DESCRIPTION

We have discovered a high-temperature plastic pyrolysis process that produces pyrolysis products that can be separated into a gaseous pyrolysis product stream that comprises light olefin product and a liquid stream comprising heavier products. The light olefin product can be separated to recover light olefin monomers while the liquid heavier products are sent to be further cracked. By recovering the light olefin products early, they are preserved from further cracking into undesirable products in the further cracking step. Additionally, the cracked effluent stream may be subjected to the recovery process along with the light olefin product.

The plastic feed can comprise polyolefins such as polyethylene and polypropylene. Any type of polyolefin plastic is acceptable even if mixed with other monomers randomly or as a block copolymer. Hence, a wider range of plastics may be recycled according to this process. We have also found that the plastics feed can be mixed polyolefins.

Polyethylene, polypropylene and polybutylene can be mixed together. Additionally, other polymers can be mixed with the polyolefin plastics or provided as feed by itself. Other polymers that can be used by itself or with other polymers include polyethylene terephthalate, polyvinyl chloride, polystyrene, polyamides, acrylonitrile butadiene styrene, polyurethane and polysulfone. Many different plastics can be used in the feed because the process pyrolyzes the plastic feed to smaller molecules including light olefins. The plastic feed stream may contain non-plastic impurities such as paper, wood, aluminum foil, some metallic conductive fillers or halogenated or non-halogenated flame retardants.

In an embodiment, the plastic feed stream may be obtained from a materials recycling facility (MRF) that is otherwise sent to a landfill. The plastic feed stream is used as feedstock for a low-temperature pyrolysis reactor (LTPR) 1. In FIG. 1, the plastic feed stream is received with minimal sorting and cleaning at the MRF site. The plastic feed may be compressed plastic articles from a separated bail of compacted plastic articles. The plastic articles can be chopped into plastic chips or particles which may be fed to the LTPR 1. An augur or an elevated hopper may be used transport the plastic feed as whole articles or as chips into the reactor. Plastic articles or chips may be heated to above the plastic melting point into a melt and injected or augured into the LTPR 1. An augur may operate in such a way as to move whole plastic articles into the LTPR 1 and simultaneously melt the plastic articles in the augur by friction or by indirect heat exchange into a melt which enters the reactor in a molten state. The plastic feed stream is fed to the LTPR 1 from feed line 3.

The LTPR 1 may be a continuous stirred tank reactor (CSTR), a rotary kiln, an augured reactor or a fluidized bed. In an embodiment, the LTPR 1 is a CSTR. The LTPR 1 may employ an agitator. In the LTPR 1 the plastic feed stream is heated to a temperature that pyrolyzes the plastic feed stream to a pyrolysis product stream. The LTPR 1 provides enough residence time for all of the plastic in the plastic feed stream to convert to low-temperature pyrolysis products. The LTPR 1 may operate at a temperature from about 300° C. (572° F.) to about 600° C. (1112° F.), or preferably about 380° C. (716° F.) to about 450° C. (842° F.), a pressure from about 0.069 MPa (gauge) (10 psig) to about 1.38 MPa (gauge) (200 psig), or preferably about 0.138 MPa (gauge) (20 psig) to about 0.55 MPa (gauge) (80 psig), a liquid hourly space velocity of the plastic feed from about 0.1 $hr^{-1}$ to about 2 $hr^{-1}$, or from about 0.2 $hr^{-1}$ to about 0.5 $hr^{-1}$ more preferably. A nitrogen blanket or a dedicated nitrogen sweeping stream in line 4 may optionally be added to the LTPR 1 at a rate of about 17 $Nm^3/m^3$ (100 scf/bbl) to about 850 $Nm^3/m^3$ plastic feed (5,000 scf/bbl), or more preferably about 170 $Nm^3/m^3$ (1000 scf/bbl) to about 340 $Nm^3/m^3$ plastic feed (2000 scf/bbl). The nitrogen sweeping stream in line 4 serves as a dilution gas to reduce impure gas partial pressure in the total vapor product.

The LTPR 1 contains liquid in phase equilibrium with the vapor product stream. A portion of the liquid stream may be taken from the LTPR 1 below the liquid level in circulation line 8 by a circulation pump 9. The pumped stream may be transported in line 8 to a heater 6, which may be an incinerator, which burns light hydrocarbons to generate heat from the heat of combustion. The pumped stream in line 8 is heated in the heater 6 and returned to the LTPR 1 at a mass flow rate and a heat transfer rate that provides all of the enthalpy requirements via the heater 6 when returning to the LTPR 1 via line 5. Necessary heat transfer is achieved by mixing the heated liquid stream in line 5 from the heater 6 and the plastic feed stream 3 in the LTPR 1.

A low-temperature pyrolysis product stream may be withdrawn from near a top of the LTPR 1 as a vaporous low-temperature product stream in line 11. A solids rich product stream may be withdrawn from the bottom of the LTPR 1 in line 7. The solids rich product stream may comprise char and non-organics. Convective heat transfer inside LTPR 1 along with mixing from the pump-around stream 11 provides uniform heating, an advantage over pyrolysis reaction methods heated via external indirect heating, commonly seen in augur or rotary kiln reactors.

The vaporous low-temperature product stream in line 11 comprises a range of hydrocarbons optionally carried by a nitrogen stream. A high-temperature pyrolysis feed stream is to be taken from the low-temperature pyrolysis product stream in line 11 to be fed into a high-temperature pyrolysis reactor (HTPR) 12. If the LTPR 1 and the HTPR 12 are at the same location meaning separated by no more than fifty miles, suitably no more than ten miles and preferably no more than a mile from each other, the low-temperature product stream in line 11 may be fed as the high-temperature pyrolysis feed stream directly to the HTPR 12 without undergoing cooling. In that case, a high-temperature pyrolysis feed stream is taken in line 120 from the low-temperature pyrolysis product stream in line 11 through a control valve on line 118 that connects line 11 with line 120. If the LTPR 1 and the HTPR 12 are not at the same location such as located by more than fifty miles, suitably more than ten miles and preferably more than a mile from each from each other, the vaporous low-temperature pyrolysis product stream may be cooled to terminate hydrogen transfer reactions and over cracking reactions which will degrade the value of the product slate recovered during a prolonged transit. In this case, the LTPR 1 may be located at a MRF; whereas, the HTPR 12 may be located at a refinery, for example.

Quenching in the latter case can be effected by diverting the vaporous low-temperature pyrolysis product stream in line 11 through line 111 via a control valve thereon to a cooler 114 which can be used to produce steam by indirect heat exchange and a cooled low-temperature pyrolysis product stream in line 128. The cooled low-temperature pyrolysis stream in line 128 may be separated in a first separator 130 to get a first vaporous low-temperature pyrolysis product stream in line 132 and a first liquid low-temperature pyrolysis product stream in line 134. The first vaporous low-temperature pyrolysis product stream in line 132 may comprise methane and dry gas, so a fuel stream can be taken from it in line 136 and combusted as fuel in the heater 6 to generate heat therein. The first separator 130 may be operated at a temperature of about 40 to about 70° C. and a pressure of about 350 to about 410 kPa (g).

The first liquid low-temperature pyrolysis product stream in line 134 may be taken as the high-temperature pyrolysis feed stream in line 120. However, a second separation may be advisable to separate a liquefied petroleum gas stream which will contain valuable C2-C4 olefins from the remainder of the low-temperature pyrolysis product stream that is taken as the high-temperature pyrolysis feed stream in line 120. In that case, the first liquid low-temperature pyrolysis product stream in line 134 may be heated and/or let down in pressure and separated in a second separator 140 to get a second vaporous low-temperature pyrolysis product stream in line 142 and a second liquid low-temperature pyrolysis product stream in line 144. The second vaporous low-temperature pyrolysis product stream in line 142 may comprise LPG, so light olefins may be recovered therefrom as monomers for a polymerization process or other use. The cold liquid low-temperature pyrolysis product stream in line 144 having $C_{5+}$ or $C_{6+}$ hydrocarbons may be taken as the high-temperature pyrolysis feed stream in line 120. The second separator 140 may be operated at a temperature of about 45 to about 80° C. and a pressure of about 150 to about 250 kPa (g).

In a further embodiment, high-temperature pyrolysis feed stream may be subjected to selective hydrogenation to convert diolefins and acetylenes from the feed stream in line 120 to monoolefins. The high-temperature pyrolysis feed stream may be diverted in line 121 to a selective hydrogenation reactor 150. Hydrogen is added to the high-temperature pyrolysis feed stream by line 152. The selective hydrogenation reactor 150 is normally operated at relatively mild hydrogenation conditions. These conditions will normally result in the hydrocarbons being present as liquid phase materials, so the reactor 150 will typically be at the site of the high-temperature pyrolysis reactor (HTPR) 12. The reactants will normally be maintained under the minimum pressure sufficient to maintain the reactants as liquid phase hydrocarbons. A broad range of suitable operating pressures therefore extends from about 276 kPa(g) to about 5516 kPa(g) (about 40 psig to about 800 psig), or about 345 kPa(g) to about 2069 kPa(g) (about 50 and 300 psig). A relatively moderate temperature between about 25° C. and about 350° C. (about 77° F. to about 662° F.), or about 50° C. and about 200° C. (about 122° F. to about 392° F.) is typically employed. The liquid hourly space velocity of the reactants through the selective hydrogenation catalyst should be above about 1.0 $hr^{-1}$ and about 35.0 $hr^{-1}$. To avoid the undesired saturation of a significant amount monoolefinic hydrocarbons, the mole ratio of hydrogen to diolefinic hydrocarbons in the material entering the bed of selective hydrogenation catalyst is maintained between 0.75:1 and 1.8:1.

Any suitable catalyst which is capable of selectively hydrogenating diolefins in a naphtha stream may be used. Suitable catalysts include, but are not limited to, a catalyst comprising copper and at least one other metal such as titanium, vanadium, chrome, manganese, cobalt, nickel, zinc, molybdenum, and cadmium or mixtures thereof. The metals are preferably supported on inorganic oxide supports such as silica and alumina, for example. The selectively hydrogenated high-temperature pyrolysis feed stream in line 160 is transported to the HTPR 12 in line 120. The hydrogenated effluent may exit the reactor in line 154 and enter a hydrogenation separator 156 to provide an overhead stream rich in hydrogen in line 158 that may be scrubbed (not shown) to remove hydrogen chloride or other compounds and compressed and returned back as hydrogen stream 152 after perhaps supplementation with a make-up hydrogen stream. A hydrogenated high-temperature pyrolysis feed stream in line 160 from the bottom of the separator 156 may be transported to the HTPR 12 in line 120.

The high-temperature pyrolysis feed stream in line 120 may comprise $C_{5+}$ or $C_{6+}$ materials that are still suitable for further conversion to light olefins for plastics. Consequently, the high-temperature pyrolysis feed stream may be subjected to high-temperature pyrolysis to produce additional quantities of light olefinic monomers for recovery. The high-temperature pyrolysis feed stream in line 120 is transported as liquid from a remote location such as from a remote MRF or is transported as a gas from a nearby location and fed to the HTPR 12. The high-temperature pyrolysis feed stream in line 120 is transported to feed line 14 which may inject feed into the HTPR 12, perhaps through the feed inlet 15 in a side 16 of the HTPR 12 through a distributor. In the high-temperature pyrolysis process, the high-temperature pyrolysis feed stream in line 14 will be recognized as a plastic feed stream keeping in mind its origin. In the HTPR 12, the high-temperature pyrolysis feed stream is heated to an elevated temperature of about 600 to about 1100° C. to further pyrolyze the high-temperature pyrolysis feed stream to a high-temperature pyrolysis product stream including monomers.

Alternatively, an exemplary plastics pyrolysis process 10 is shown in FIG. 1 which utilizes a fresh plastics feed to the process perhaps from a materials recovery facility that is fed to a HTPR 12 in the feed line 14 through a feed inlet 15. The plastic feed may be compressed plastic articles from a separated bail of compacted plastic articles. The plastic articles can be chopped into plastic chips or particles which may be fed to the HTPR 12. An augur or an elevated hopper may be used transport the plastic feed as whole articles or as chips into the reactor. Plastic articles or chips may be heated to above the plastic melting point into a melt and injected or augured into the HTPR 12. An augur may operate in such a way as to move whole plastic articles into the HTPR 12 and simultaneously melt the plastic articles in the augur by friction or by indirect heat exchange into a melt which enters the reactor in a molten state.

The fresh plastic feed can comprise polyolefins such as polyethylene and polypropylene. Any type of polyolefin plastic is acceptable even if mixed with other monomers randomly or as a block copolymer. Hence, a wider range of plastics may be recycled according to this process. We have also found that the plastics feed can be mixed polyolefins. Polyethylene, polypropylene and polybutylene can be mixed together. Additionally, other polymers can be mixed with the polyolefin plastics or provided as feed by itself. Other polymers that can be used by itself or with other polymers include polyvinyl chloride, polystyrene, polyamides, etc. Many different plastics can be used in the feed because the process pyrolyzes the plastic feed to light olefins.

The feed injected into the HTPR 12 may be contacted with a diluent gas stream. The diluent gas stream is preferably inert but it may be a hydrocarbon gas. Steam is a preferred diluent gas stream. The diluent gas stream separates reactive olefin products from each other to preserve the selectivity to light olefins thus avoiding oligomerization of light olefins to higher olefins or over cracking to light gas. The diluent gas stream may be provided through a distributor from a diluent line 18 and may be distributed through a diluent inlet 19. The diluent gas stream may be blown into the HTPR 12 through the diluent inlet 19. The diluent inlet 19 may be in a bottom of the HTPR 12. The diluent gas stream may be used to impel plastic feed or the high-temperature pyrolysis feed stream from the feed inlet 15 of the HTPR 12 to an outlet 20 of the reactor. In an aspect, the feed inlet 15 may be at a lower end of the HTPR 12 and the outlet 20 may be at an upper end of the reactor. The interior of the wall 16 of the HTPR 12 may be coated with refractory lining to insulate the reactor and conserve its heat.

The plastic feed or the high-temperature pyrolysis feed stream should be heated to a pyrolysis temperature of about 600 to about 1100° C., suitably at least about 800° C. and preferably about 850 to about 950° C. The high-temperature pyrolysis temperature will be much higher than the melting temperature of the plastic at which the plastic may be fed to the HTPR 12. The plastic feed can be preheated to high-temperature pyrolysis temperature before it is fed to the HTPR 12 but is preferably heated to high-temperature pyrolysis temperature after entering the HTPR 12. In an embodiment, the fresh plastic feed is heated to high-temperature pyrolysis temperature by contacting it with a stream of hot heat carrier particles. The stream of hot heat carrier particles may be fed to the reactor in a carrier line 22 through a particle inlet 23. In an aspect, the particle inlet 23 may be located between the diluent inlet 19 and the plastic feed inlet 15. The diluent gas stream will then contact and move the stream of hot heat carrier particles into contact with the plastic feed or the high-temperature pyrolysis feed stream from feed line 14 through feed inlet 15.

It is contemplated that the stream of heat carrier particles and the feed stream be contacted with each other before entering the HTPR 12, in which case the plastic feed stream and the stream of heat carrier particles may enter the HTPR 12 through the same inlet. It is also contemplated that some or all of the diluent gas stream may impel the heat carrier particles into the reactor in which case the diluent gas stream and the stream of heat carrier particles may enter the HTPR 12 through the same inlet. Additionally, the diluent gas stream may impel the fresh plastic feed or the high-temperature pyrolysis feed stream into the reactor in which case the diluent gas stream and the plastic feed stream may enter the HTPR 12 through the same inlet. It is also contemplated that the feed stream and the stream of heat carrier particles may be impelled into the HTPR 12 by some or all of the diluent gas stream, in which case at least some of the diluent stream, the feed stream and the stream of heat carrier particles may all enter the HTPR 12 through the same inlet.

It another embodiment, the feed inlet 15 and the particle inlet 23 may be located in an upper end of the reactor from which they can fall together in a downer reactor arrangement (not shown). The diluent gas stream would not function in this embodiment to upwardly fluidize the feed and heat carrier particles.

Upon heating the feed to pyrolysis temperature, the plastic feed or the high-temperature pyrolysis feed stream vaporizes and pyrolyzes to smaller molecules including light olefins. The vaporization and conversion to a greater number of moles both increase volume causing rapid movement of feed and pyrolysis product toward the reactor outlet 20. Due to the volume expansion of the plastic feed, a diluent gas stream is not necessary to rapidly move feed and product to the outlet. However, diluent gas also serves to separate product olefins from each other and from heat carrier particles to prevent oligomerization and over-cracking which both diminish light olefin selectivity. So, the diluent gas stream may be employed to move the feed stream while undergoing pyrolysis while in contact with the stream of hot heat carrier particles toward the reactor outlet 20. In an aspect, we have found that the diluent gas stream can be introduced at a high carbon-to-gas mole ratio of about 0.6 to about 20. The carbon-to-gas mole ratio may be at least about 0.7, suitably at least about 0.8, more suitably at least about 0.9 and most suitably at least about 1.0. In an aspect, the carbon-to-gas mole ratio may not exceed about 15, suitably may not exceed about 12, more suitably may not exceed about 9 and most suitably may not exceed about 7 and preferably will not exceed about 5. The high carbon-to-gas mole ratio importantly reduces the amount of diluent gas that must be separated from other gases including product gases.

The stream of hot heat carrier particles may be an inert solid particulate such as sand. Additionally, spherical particles may be most easily lifted or fluidized by the diluent gas stream. A spherical alpha alumina may be a preferred material for heat carrier particles. The spherical alpha alumina may be formed by spray drying an alumina solution, followed by calcining it at a temperature that converts the alumina to the a-alumina crystalline phase. In an embodiment, the heat carrier particles should have a smaller average diameter than the plastic articles, chips or melt fed to the reactor. The average diameter of the heat carrier particles refers to the largest average diameter of the particles. The fresh plastic feed melt may enter the reactor in molten globs that will typically have a larger average diameter than the heat carrier particles.

The feed stream may be pyrolyzed using various pyrolysis methods including fast pyrolysis and other pyrolysis methods such as vacuum pyrolysis, slow pyrolysis, and others. Fast pyrolysis includes rapidly imparting a relatively high temperature to feedstocks for a very short residence time, typically about 0.5 seconds to about 0.5 minutes, and then rapidly reducing the temperature of the pyrolysis products before chemical equilibrium can occur. By this approach, the structures of the polymers are broken into reactive chemical fragments that are initially formed by depolymerization and volatilization reactions, but do not persist for any significant length of time. Fast pyrolysis is an intense, short duration process that can be carried out in a variety of pyrolysis reactors such as fixed bed pyrolysis reactors, fluidized bed pyrolysis reactors, circulating fluidized bed reactors, or other pyrolysis reactors capable of fast pyrolysis.

The pyrolysis process produces a carbon-containing solid called char, coke that accumulates on the heat carrier particles and pyrolysis gases comprising hydrocarbons including olefins and hydrogen gas.

The heat carrier particles and the plastic feed stream may be fluidized in the reactor by the diluent gas stream. The plastic feed stream and the stream of heat carrier particles may be fluidized by the diluent gas stream continually entering the HTPR 12 through the diluent inlet 19. The heat carrier particles and plastic feed stream can be fluidized in a dense bubbling bed. The molten plastic of the fresh plastic feed stream and heat carrier particles may congeal together into globs until the plastic in the glob fully pyrolyzes to gas. In a bubbling bed, diluent gas stream and vaporized plastic form bubbles that ascend through a discernible top surface of a dense particulate bed. Only heat carrier particles entrained in the gas exits the reactor with the vapor. If only the high-temperature pyrolysis feed stream is fed to the HTPR 12, the superficial velocity of the gas in a bubbling bed will typically be less than 3.4 m/s (11.2 ft/s) and the density of the dense bed will be typically greater than 475 kg/m$^3$ (49.6 lb/ft$^3$). If a solid plastic feed is fed as solid particles or fed as a melt to the HTPR 12, such that the plastic feed and heat carrier particles congeal into globs, the superficial velocity for solid plastic feed will be less than 2.7 m/s (9 ft/s) and the density of the bed will be greater than 274 kg/m$^3$ (17.1 lb/ft$^3$). The mixture of heat carrier particles and gas is heterogeneous with pervasive vapor bypassing of catalyst. In the dense bubbling bed, gases will exit the reactor outlet 20; whereas, the solid heat carrier particles and char may exit from a bottom outlet (not shown) of the HTPR 12.

In an aspect, the HTPR 12 may operate in a fast-fluidized flow regime or in a transport or pneumatic conveyance flow regime with a dilute phase of heat carrier particles. The HTPR 12 will operate as a riser reactor. As indicated previously, it is not anticipated that globs will form with the high-temperature pyrolysis feed stream resulting from the low-temperature pyrolysis process. The high-temperature pyrolysis feed stream will quickly vaporize upon heating in the HTPR 12, pyrolyze and flow with the diluent gas stream.

With fresh plastic feed, in a fast-fluidized flow and transport flow regime, the stream of globs of heat carrier particles and molten plastic undergoing pyrolysis, gaseous pyrolyzed plastic and the diluent gas stream will flow upwardly together. A quasi-dense bed of plastic and heat carrier particle globs will undergo pyrolysis at the bottom of the HTPR 12. The globs of plastic and heat carrier particles will transport upwardly upon sufficient size reduction due to pyrolysis.

The diluent gas stream may lift the plastic feed stream and the stream of heat carrier particles. The mixture of gases and the heat carrier particles may be discharged together from the reactor outlet 20 if a separator 30 is located outside of the HTPR 12. If a separator 30 is located in the HTPR 12, the gases will be discharged from the reactor outlet 20 and the heat carrier particles and char will exit from an additional heat carrier particle outlet. Typically, the reactor outlet 20 which discharges the heat carrier particles will be above the heat carrier particle inlet 23. Furthermore, separation of the heat carrier particles from the gaseous products will be conducted above the heat carrier particle inlet 23 and/or the feed inlet 15 in transport and fast-fluidized flow regimes.

The density for a fluid feed in the fast-fluidized flow regime will be between at least about 274 kg/m$^3$ (17.1 lb/ft$^3$) to about 475 kg/m$^3$ (49.6 lb/ft$^3$) and in a transport flow regime will be no more than 274 kg/m3 (17.1 lb/ft$^3$). The density for a plastic feed that congeals into globs in the fast-fluidized flow regime will be between at least about 120 kg/m$^3$ (7.5 lb/ft$^3$) and 274 kg/m$^3$ (17.1 lb/ft$^3$) and in a transport flow regime will be no more than 120 kg/m3 (7.5 lb/ft$^3$). The superficial gas velocity will typically be at least about 2.7 m/s (9 ft/s) to about 8.8 m/s (28.9 ft/s) in a fast-fluidized flow regime for globs of heat carrier particles congealed with plastic. In a transport flow regime, the superficial gas velocity will be at least about 8.8 m/s (28.9 ft/s) for globs of heat carrier particles congealed with plastic. The superficial gas velocity will typically be at least about 3.4 m/s (11.2 ft/s) to about 7.3 m/s (15.8 ft/s) in a fast-fluidized flow regime for fluid plastic feed. In a transport flow regime, the superficial gas velocity will be at least about 7.3 m/s (15.8 ft/s) for fluid plastic feed. The diluent gas stream and product gas ascend in a fast-fluidized flow regime but the hot solids may slip relative to the gas and the gas can take indirect upward trajectories. In a transport flow regime, less of the solids will slip. Residence time for the plastics and product gas in the reactor will about 1 to about 20 seconds and typically no more than 10 seconds.

The reactor effluent comprising heat carrier particles, diluent gas stream and high-temperature pyrolyzed product gas may exit the HTPR 12 through the reactor outlet 20 in a reactor effluent line 28 and be transported to a separator 30. In an aspect, the separator 30 may be located in the HTPR 12. If the separator 30 is located in the HTPR 12, the heat carrier particles, the diluent gas stream and the pyrolyzed product gas will enter into the separator 30. The reactor effluent in line 28 will be at a temperature of about 600 to about 1100° C. and a pressure of about 1.5 to 2.0 bar (gauge).

The separator 30 may be a cyclonic separator that utilizes centripetal acceleration to separate the heat carrier particles from pyrolyzed gaseous products. The reactor effluent line 28 may tangentially cast reactor effluent into the cyclone separator 30 in a typically horizontally angular trajectory causing the reactor effluent to centripetally accelerate. The centripetal acceleration causes the denser heat carrier particles to gravitate outwardly. The particles lose angular momentum and descend in the cyclone separator 30 into a lower catalyst bed and exit through a heat carrier dip line 32. The less dense gaseous product ascends in the cyclone 30 and are discharged through transfer line 34. In an aspect, pyrolysis gas products may be stripped from heat carrier particles in line 32 by adding a stripping gas to a lower end of the dip line 32. In this embodiment, stripping gas and stripped pyrolysis gases would exit the separator 30 in the transfer line 34.

In an embodiment, a high-temperature pyrolysis product stream in the transfer line 34 may be immediately quenched to prevent and terminate hydrogen transfer reactions and over-cracking which may occur to diminish light olefin selectivity in the high-temperature pyrolysis product stream. Quenching may be effected in the following manner although other quenching processes are contemplated. The high-temperature pyrolysis product stream may be cooled by indirect heat exchange perhaps with water to make steam for the diluent gas stream in a transfer line exchanger 36. The exchanged high-temperature pyrolysis product stream in line 38 may be at a temperature of about 300 to about 400° C. In an aspect, the exchanged high-temperature pyrolysis product stream may be completely quenched by indirect heat exchange with water to produce steam in the transfer line exchanger 36. If the exchanged high-temperature pyrolysis product stream is completely quenched by indirect heat exchange, the completely cooled high-temperature pyrolysis product stream may exit the transfer line exchanger 36 at about 30 to about 60° C. and around atmospheric pressure, 1 to about 1.3 bar (gauge), so lighter components of the vaporous high-temperature pyrolysis product stream can condense.

Alternatively, the exchanged high-temperature pyrolysis product stream in line 38 may be immediately quenched with an oil stream from line 40, such as a fuel oil, in an oil quench chamber 42 to further quench the exchanged high-temperature pyrolysis product stream. The oil stream may be sprayed transversely into the flowing exchanged high-temperature pyrolysis product stream. The exchanged high-temperature pyrolysis product stream remains in the vapor phase while the oil stream exits a bottom of the oil quench chamber 42. The oil stream after exiting the oil quench chamber 42 may be cooled and recycled back to the oil quench chamber. The oil quenched gaseous product stream exits the oil quench chamber in line 44 and may be delivered to a water quench chamber 46 for further quenching. The oil quenched gaseous product stream in line 44 may be immediately quenched with a water stream from line 48 in water quench chamber 46 to further quench the oil quenched gaseous product stream. The water stream may be sprayed transversely into the flowing oil-quenched gaseous product stream. The water quenched gaseous product stream is cooled to about 30 to about 60° C. and around atmospheric pressure, 1 to about 1.3 bar (gauge), so lighter components of the gaseous product stream condense.

In the embodiment in which the transfer line exchanger 36 may comprise one or a series of heat exchangers which indirectly cool the gaseous pyrolysis product stream in the transfer line 34 without direct quench with oil or water, the transfer line 38 will directly connect the transfer line exchanger 36 to the high-temperature pyrolysis separator 55.

The high-temperature pyrolysis product stream in line 54, whether only indirectly quenched in a transfer line heat exchanger 36 or if additionally, directly quenched in quench chambers 42 and 46, is partially condensed due to rapid cooling. The high-temperature pyrolysis product stream is separated in a high-temperature pyrolysis separator 55 to separate a gaseous high-temperature pyrolysis product stream in an overhead line 52 extending from a top of the separator from a liquid high-temperature pyrolysis product stream in a bottoms line 57 extending from a bottom of the separator. The separator 55 may be in downstream communication with the HTPR 12. An aqueous stream in line 50 may be removed from a boot in the high-temperature pyrolysis separator 55 if an aqueous stream is present such as resulting from the water quench chamber 46 in an embodiment. The liquid high-temperature pyrolysis product stream comprising $C_{5+}$ hydrocarbons may be removed from the water quench chamber above the boot in line 57.

The aqueous stream in the water line 50 may be vaporized perhaps by heat exchange in the transfer line exchanger 36 and/or in a water line exchanger 56 and used as the diluent gas stream. A blower 58 blows the steam through the diluent line 19 into the HTPR 12 via the diluent inlet 19.

The gaseous pyrolysis product stream in the overhead line 52 may be compressed in a compressor 80 to about 2 to about 3 MPa (gauge). The compressed gaseous pyrolysis product stream at about 100 to about 150° C. may then be fed to a caustic wash vessel 90 in caustic line 82. In the caustic wash vessel 90, the compressed gaseous product stream is contacted with aqueous sodium hydroxide fed through line 92 into the caustic wash vessel 90 to absorb acid gases such as carbon dioxide into the sodium hydroxide. The carbon dioxide and sodium hydroxide produce sodium carbonate which goes into the aqueous phase and exits in an acid gas rich stream through a caustic bottoms line 96 to be regenerated and recycled. The washed gaseous high-temperature pyrolysis product stream is discharged in a cracked gas line 94 and is fed to a drier 100 to remove residual moisture.

In the drier 100, water is removed from the washed gaseous high-temperature pyrolysis product stream by contacting it with an adsorbent such as a silica gel to adsorb the water or heated to vaporize the water, removing it from the gaseous high-temperature pyrolysis product stream. A water stream is removed in the water line 104 from the drier 100. A dried gaseous high-temperature pyrolysis product stream is recovered in a dried cracked gas line 102

The dried gaseous high-temperature pyrolysis product stream comprises C2, C3 and C4 olefins which can be recovered and used to produce plastics by polymerization. We have found at least 50 wt %, typically at least 60 wt % and suitably at least 70 wt % of the product recovered from gaseous products are valuable ethylene, propylene and butylene products. At lower, more economical carbon-to-diluent gas mole ratios, we have found that at least 40 wt % of the products recovered are valuable light olefins. Recovery of these light olefins represents a circular economy for recycling plastics. A polymerization plant may be on site or the recovered olefins may be transported to a polymerization plant.

Turning back to the separator 30, the heat carrier particles in the heat carrier dip line 32 may have accumulated coke from the pyrolysis process. Moreover, char residue from the pyrolysis process may also end up with the solids in the heat carrier dip line 32. The heat carrier particles have also given off much of their heat in the HTPR 12 and need to be reheated. Therefore, the heat carrier dip line 32 delivers the heat carrier particles and char to the reheater 60.

In aspect, the predominance of heat carrier particles entering the reheater 60 passes through the separator 30. In an embodiment, all of the heat carrier particles entering the reheater 60 passes through the separator 30.

The heat carrier particles and char are fed to the reheater 60 and contacted with an oxygen supply gas in line 62 such as air to combust char and the coke on the cool heat carrier particles. The reheater 60 is a separate vessel from the HTPR 12. The coke is burned off the spent catalyst by contact with the oxygen supply gas at combustion conditions. Heat of combustion serves to reheat the heat carrier particles. About 10 to about 15 kg of air are required per kg of coke burned off of the heat carrier particles. A fuel gas stream in line 64 may also be added to the reheater 60 if necessary, to produce sufficient heat to drive the pyrolysis reaction in the HTPR 12. The fuel gas may be obtained from paraffins recovered from the gaseous high-temperature pyrolysis product stream in line 102. Exemplary reheating conditions include a temperature from about 700° C. to about 1000° C. and a pressure of about 1 to about 5 bar (absolute) in the reheater 60.

A stream of reheated heat carrier particles is recycled to the high-temperature pyrolysis reactor 12 in line 22 through heat carrier particle inlet 23 at a temperature of the reheater 60. Flue gas and entrained char exit the reheater in line 66 and are delivered to a cyclone 70 which separates exhaust gas in an overhead line 72 from a solid ash product in line 74.

Figure 2:
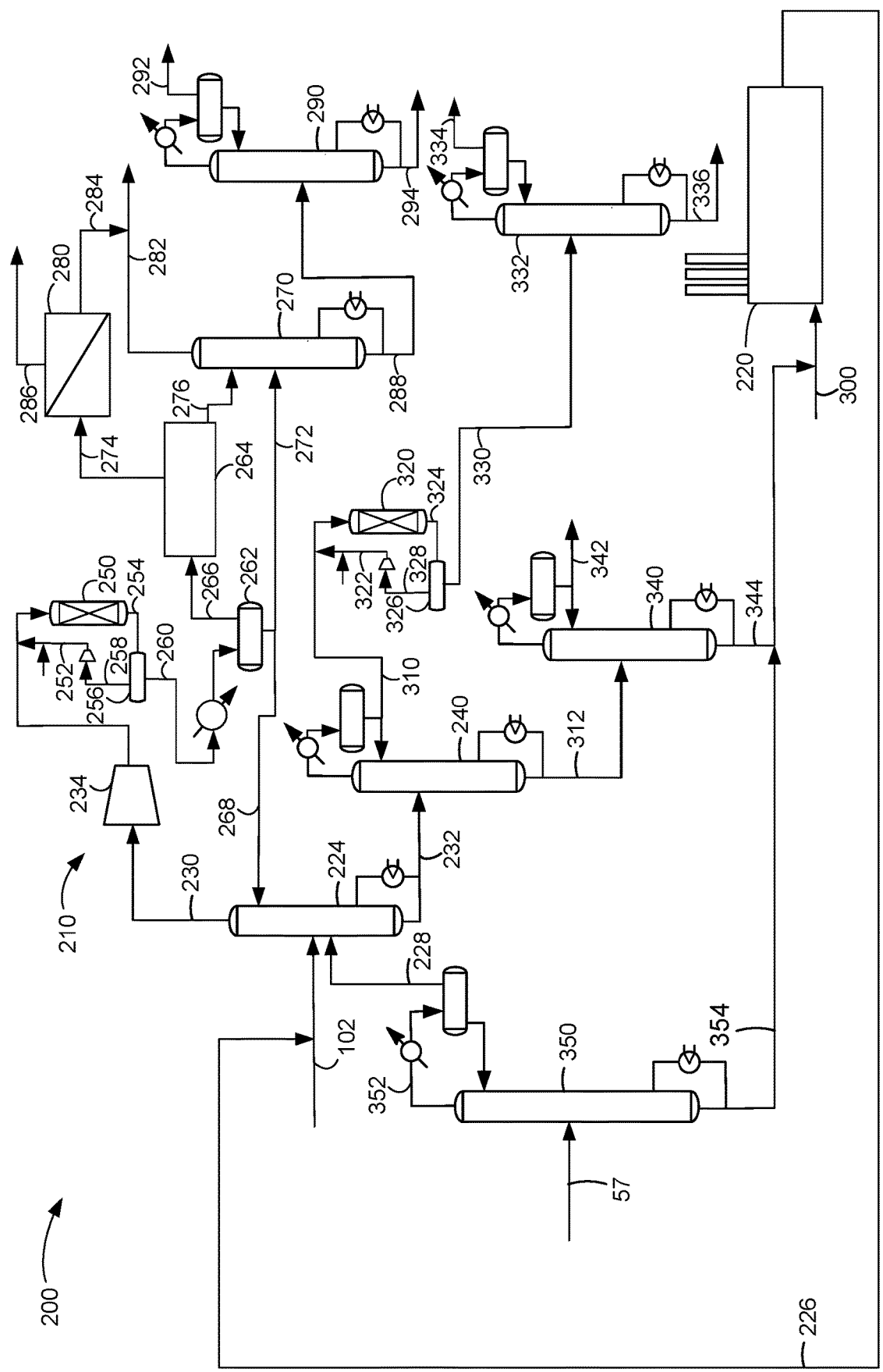
FIG. 2 is a schematic drawing of a recovery process and apparatus for the present disclosure.

FIG. 2 depicts a recovery process and apparatus 200 for the present disclosure. The dried gaseous pyrolysis product stream in line 102 comprising gaseous pyrolysis product may be fed to a light olefin recovery process (LORP) section 210 that may or may not already be existing and/or servicing a cracking unit 220. The gaseous pyrolysis product stream in line 102 may also comprise and/or taken from the low-temperature pyrolysis product stream in line 142 from FIG. 1. The cracking unit 220 may be a steam cracking unit, a fluid catalytic cracking unit, a hydrocracking unit or other cracking unit that cracks larger molecules to smaller molecules. In an embodiment, the cracking unit 220 is a steam cracking unit and will be exemplarily described as such, herein. The dried gaseous high-temperature pyrolysis product stream in line 102 taken from the gaseous pyrolysis product stream in line 52 may be fed to the LORP section 210 to recover light olefin monomers from the gaseous pyrolysis product stream. A cracking effluent stream in line 226 from the cracking unit 220 and a distillate stripper overhead stream in a distillate stripper net overhead line 228 may also be fed to the LORP section 210 with the dried gaseous high-temperature pyrolysis product stream in line 102. In an embodiment, the dried gaseous high-temperature pyrolysis product stream in line 102, the cracking effluent stream in line 226 and the distillate stripper net overhead stream in line 228 may be combined or fed separately to a fractionation column in the LORP section 210. The fractionation column may be a deethanizer column 224. Specifically, the dried cracked gas stream in line 102 comprising a gaseous pyrolysis product stream may be fed separately or with a cracking effluent stream in line 226 from the cracking unit 220 and/or a distillate stripper overhead stream to the deethanizer fractionation column 224 in the LORP section 210. The LORP section 210 may be in downstream communication with the high-temperature pyrolysis separator 55. The LORP section 210 is also in downstream communication with the distillate stripper net overhead line 228.

The high-temperature pyrolysis liquid stream in line 57 from FIG. 1 may be fed to an optional distillate stripper column 350 which serves as a debutanizer to roughly separate C4− hydrocarbons in a stripper overhead stream from a C5+ hydrocarbons in a stripper bottoms stream. Alternatively, the high-temperature pyrolysis liquid stream in line 57 from FIG. 1 may be fed to an optional distillate stripper column 350 which serves as a depentanizer to roughly separate C5− hydrocarbons in a stripper overhead stream from a C6+ stripper bottoms stream, respectively. The distillate stripper overhead stream in the distillate stripper net overhead line 228 is rich in C4– and/or C5– hydrocarbons. The distillate stripper overhead stream is withdrawn from the distillate stripper column 350 in an overhead line 352, through a cooler and into a separator. The condensed distillate stripper overhead stream is recycled to the distillate stripper column 350 as reflux through a reflux line and the vaporous distillate stripper net overhead stream may be fed to the LORP section 210 along with the cracking unit effluent stream in line 226 and the gaseous high-temperature pyrolysis product stream in line 102. It is also contemplated that a gaseous low-temperature pyrolysis product stream in line 142 may also be fed to the LORP section 210 in line 102. The distillate stripper column 350 operates in bottoms temperature range of about 100 to about 1 80° C., preferably 125 to about 1 50° C., and an overhead pressure range of about 2000 to about 2250 kPa (gauge). The distillate stripper column 350 may be in downstream communication with the bottoms line 57 of the high temperature pyrolysis separator 55.

The distillate stripper bottoms stream is withdrawn from the distillate stripper column 350 through a bottoms line from which a portion of the distillate stripper bottoms flows through a reboiler line, a reboiler heater and returns to the distillate stripper column 350. The remaining portion of the distillate stripper bottoms stream flows through a net stripper bottoms line 354. The distillate stripper net bottoms stream comprising $C_{5+}$ hydrocarbons may be taken as the cracking unit feed stream in line 300. The cracking unit 220 may already be fed by the cracking unit feed stream in line 300, but the distillate stripper bottoms stream in line 354 and a debutanized bottoms stream in line 344 may be used to supplement the cracking feed stream in line 300, so the cracking unit feed stream may be taken from the distillate stripper bottoms stream in line 354 and/or the debutanizer bottom stream in line 344. However, if the distillate stripper column produces a $C_{6+}$ hydrocarbon cut, the distillate stripper net bottoms stream may be fed to a hexene column 360 to recover a valuable hexene-1 stream.

Figure 3:
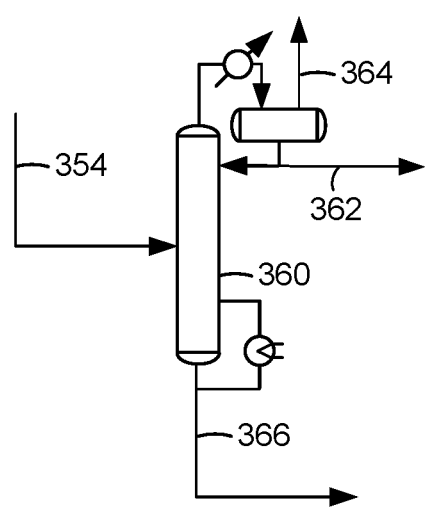
FIG. 3 is an alternative schematic drawing of FIG. 3.

The optional hexene column 360 is shown in FIG. 3. The distillate stripper net bottoms stream in line 354 from FIG. 2 may be fed to the optional hexene column 360 to separate a hexene-1 stream in an overhead line from a normal $C_{6+}$ hexene column bottoms stream. The hexene-1 stream is a valuable petrochemical that we have found is present in pyrolyzed plastic streams. The hexene column overhead stream is withdrawn from the hexene column 360 in an overhead line, cooled in a cooler and fed into a separator. The condensed hexene column overhead stream is recycled to the distillate stripper column 350 as reflux through a reflux line while a condensed hexene-1 product is collected in a net overhead liquid line 362. Uncondensed off-gases may be collected in a net hexene column vent line 364 and fed to the distillate stripper net overhead line 228 of FIG. 2 to be separated in the LORP 210 along with the cracking unit effluent stream in line 226 and the gaseous pyrolysis product stream in line 102. The hexene column 360 operates in a bottoms temperature range of about 150 to about 200° C., preferably 160 to about 190° C., and an overhead pressure range of about 1800 to about 2100 kPa (gauge).

The hexene column bottoms stream is withdrawn from the hexene column 350 through a bottoms line from which a portion of the hexene column bottoms flows through a reboiler line, a reboiler heater and returns to the hexene column 360. The remaining portion of the hexene column bottoms stream flows through a net hexene column bottoms line 366. The hexene column net bottoms stream comprising hydrocarbons boiling at above the normal-$C_6$ boiling range may be fed back to the distillate stripper net bottom line 354 and taken as cracking unit feed in line 300. Consequently, the cracking unit feed stream in line 300 may be taken from the hexene column bottoms product.

Turning back to FIG. 2, the deethanizer column 224 separates a gaseous pyrolysis product stream in the dried cracked gas line 102, the cracking effluent stream in line 226 and the distillated stripper net overhead stream in line 228 into a deethanizer overhead stream rich in $C_2$-hydrocarbons in a deethanizer overhead line 230 and a deethanized bottoms stream rich in $C_{3+}$ hydrocarbons in a deethanizer bottoms line 232. The deethanized bottoms stream is withdrawn from the deethanizer column 224 through a bottoms line from which a portion of the deethanized bottoms stream flows through a reboiler line, a reboiler heater and returns to the deethanizer column 224. The remaining portion of the deethanized bottoms stream flows through a net deethanized bottoms line 232 comprising $C_{3+}$ hydrocarbons and is fed to a depropanizer column 240. The deethanizer column 224 operates in bottoms temperature range of about 100 to about 130° C. and an overhead pressure range of about 210 to about 300 kPa (gauge).

The deethanizer overhead stream may be withdrawn from the deethanizer column 224 in a deethanizer overhead line 230. The deethanizer overhead stream may be compressed in a compressor 234 up to a pressure of about 1500 to about 3500 kPa (gauge) to prepare it for ethylene recovery. Furthermore, the deethanizer overhead stream may comprise acetylenes that require selective hydrogenation to make it a suitable ethylene feed for a polymerization plant. The compressed deethanizer overhead stream may be at appropriate pressure for selective hydrogenation in a $C_2$ selective hydrogenation reactor 250.

Hydrogen may be added to the compressed deethanizer overhead stream in line 230 before it is fed to the $C_2$ selective hydrogenation reactor 250. The C2 selective hydrogenation reactor 250 is normally operated at relatively mild hydrogenation conditions at liquid phase conditions so it appropriately follows the compressor 234. A broad range of suitable operating pressures therefore extends from about 276 kPa(g) to about 5516 kPa(g) (about 40 psig to about 800 psig), or about 345 kPa(g) to about 2069 kPa(g) (about 50 and 300 psig). A relatively moderate temperature between about 25° C. and about 350° C. (about 77° F. to about 662° F.), or about 50° C. and about 200° C. (about 122° F. to about 392° F.) is typically employed. The liquid hourly space velocity of the reactants through the selective hydrogenation catalyst should be above about 1.0 $hr^{-1}$, or above about 35.0 $hr^{-1}$. To avoid the undesired saturation of a significant amount mono-olefinic hydrocarbons, the mole ratio of hydrogen to multi-olefinic hydrocarbons in the material entering the bed of selective hydrogenation catalyst is maintained between 0.75:1 and 1.8:1. The hydrogenated effluent may exit the reactor in line 254 and enter a hydrogenation separator 256 to provide an overhead stream rich in hydrogen in line 258 that may be compressed and returned back as hydrogen stream 252 after perhaps supplementation with a make-up hydrogen stream.

A hydrogenated deethanizer overhead stream in line 260 from the bottom of the separator 256 may be further cooled and separated in a deethanizer reflux separator 262. A vapor stream from the reflux separator 262 may be forwarded to a cold box 264 in line 266 while a liquid stream from the reflux separator 262 may be refluxed back to the deethanizer column 224 in line 268. If surplus reflux is provided from the deethanizer reflux separator 262 a portion of the liquid stream from the reflux separator 262 may be forwarded to a demethanizer column 270.

The cold box 264 typically has a series of cryogenic heat exchangers between process and/or refrigerant streams and the hydrogenated, compressed, deethanizer overhead stream in line 266 followed by separators to remove vapor streams from liquid streams. Most of the hydrogen is recovered as a cold box gas stream in a cold box gas line 274 from the cold box 264. The cold box gas stream may be fed to a pressure swing adsorption (PSA) unit 280 to recover purified hydrogen. A cold box liquid stream rich in methane and $C_{2+}$ hydrocarbons is removed from the cold box in a cold box liquid line 276.

In the pressure swing adsorption unit 280, the cold box gas stream may be separated into a hydrogen rich stream and a methane rich stream which may be used to supplement a fuel gas stream in line 282. The cold box gas stream may be fed to the PSA unit 280 in which hydrogen is adsorbed onto an adsorbent in a plurality of beds in series while allowing larger molecules such as methane and $C_{2+}$ hydrocarbons to pass by the adsorbent in the beds. The adsorption pressure may be about 1 MPa (150 psia) to about 1.7 MPa (250 psia) to adsorb hydrogen. A tail gas stream rich in methane and $C_{2+}$ hydrocarbons exit the PSA unit 280 in a tail gas line 284. The adsorbent beds may be connected in series to cycle between pressures. Flow to each adsorbent bed is periodically terminated and the pressure in the terminated bed is decreased in stages to release void space gas and then to blow down to desorb hydrogen from the adsorbent in the terminated bed and pass into a hydrogen product stream in a hydrogen product line 286. A blow down pressure of 34.5 kPa (5 psia) to about 172 kPa (25 psia) may be used to desorb hydrogen from the adsorbent. A suitable adsorbent may be activated calcium zeolite A. The tail gas stream in the tail gas line 284 may comprise about 60 to about 85 mol % hydrogen, about 15 to about 35 mol % methane, and about 1 to about 10 mol % $C_{2+}$ hydrocarbons. The tail gas stream may be added to the fuel gas in line 282 and forwarded to the fuel gas header.

The cold box liquid stream in line 276 and the surplus reflux liquid from the deethanizer reflux separator 262 in line 272 may be fractionated in the demethanizer fraction column 270 to provide a demethanizer overhead stream in a demethanizer overhead line 282 comprising methane and lighter gases and demethanized bottoms stream in a demethanizer bottoms line comprising $C_2$ hydrocarbons. The demethanizer overhead stream in line 282 may be combined with the PSA tail gas in line 284 to supply the fuel gas header. The demethanized bottoms stream is withdrawn from the demethanizer column 270 through a bottoms line from which a portion of the demethanized bottoms stream flows through a reboiler line, a reboiler heater and returns to the demethanizer column 270. The remaining portion of the demethanized bottoms flows through a net deethanized bottoms line 288 comprising $C_2$ hydrocarbons and is fed to a $C_2$ splitter column 290 to recover ethylene monomer. The demethanizer column 270 operates in bottoms temperature range of about −40 to about 100° C., preferably about 20 to about 0° C., and an overhead pressure range of about 3100 to about 3400 kPa (gauge).

The demethanized $C_2$ hydrocarbon stream may be further processed in the C2 splitter column 290 to recover an ethylene rich product monomer stream in a C2 splitter net overhead line 292 and an ethane rich stream in a C2 splitter bottoms line 294. The C2 splitter overhead stream is withdrawn from an overhead of the C2 splitter column 290 in the overhead line 292, condensed in a cooler and fed to a separator. A condensed C2 splitter overhead stream is recycled to the C2 splitter column 290 as reflux through a reflux line and the remaining uncondensed C2 splitter overhead stream is withdrawn through a net C2 splitter overhead line 76 and recovered as ethylene product. The C2 splitter overhead stream will be highly concentrated in ethylene adequate for a polymerization plant. The ethane rich stream is withdrawn from the C2 splitter column 290 through a C2 splitter bottoms line from which a portion of the bottoms flows through a reboiler line and a reboiler heater and returns heated to the C2 splitter column 290. The remaining portion of the ethane rich bottoms stream flows through the net C2 splitter bottoms line 294 and can be taken as fuel gas or burned upstream such as in the heater 6 or cracking feed in line 300 can be taken from the ethane rich bottoms stream. The C2 splitter column 290 may operate at an overhead pressure of about 400 to about 2500 kPa (gauge), preferably about 500 to about 800 kPa (gauge) and a bottoms temperature of about −30° C. to about −10° C.

The net deethanized bottoms stream in the net deethanizer bottoms line 232 rich in $C_{3+}$ hydrocarbons is concentrated in propylene monomers which require recovery. Hence, the net deethanized bottoms stream is fractionated in the depropanizer column 240 into a depropanizer overhead stream which is rich in $C_3$ hydrocarbons and a $C_{4+}$ hydrocarbon-rich depropanized bottoms stream. The depropanizer overhead stream is withdrawn from an overhead of the depropanizer column 240 in the overhead line, condensed in a cooler and fed to a receiver. A condensed depropanizer overhead stream is refluxed to the depropanizer column 240 as reflux through a reflux line and the remaining condensed depropanizer overhead stream is withdrawn through a depropanizer net overhead line 310. The depropanizer overhead stream in the depropanizer net overhead line 310 will comprise diolefins and acetylenes which require saturation, so it is transported to the C3 selective hydrogenation reactor 320. A $C_{4+}$ hydrocarbon-rich stream is withdrawn from the depropanizer column 240 through a depropanizer bottoms line from which a portion of the bottoms flows through a reboiler line and a reboiler heater and returns heated to the depropanizer column 240. The remaining portion of the $C_{4+}$ hydrocarbon-rich stream in the depropanizer net bottoms line 312 is rich in $C_{4+}$ hydrocarbons. The depropanizer column 240 may operate at an overhead pressure of about 1000 to about 2000 kPa (gauge) and a bottoms temperature of about 70° C., preferably at least about 80° C., to about 150° C.

Hydrogen may be added to the depropanizer net overhead stream in line 310 before it is fed to the C3 selective hydrogenation reactor 320. The C3 selective hydrogenation reactor 320 is normally operated at relatively mild hydrogenation conditions at liquid phase conditions so the depropanizer net overhead stream is fully condensed to prepare it for selective hydrogenation. A broad range of suitable operating pressures therefore extends from about 276 kPa(g) to about 5516 kPa(g) (about 40 psig to about 800 psig), or about 345 kPa(g) to about 2069 kPa(g) (about 50 and 300 psig). A relatively moderate temperature between about 25° C. and about 350° C. (about 77° F. to about 662° F.), or about 50° C. and about 200° C. (about 122° F. to about 392° F.) is typically employed. The liquid hourly space velocity of the reactants through the selective hydrogenation catalyst should be above about 1.0 hr−1, or above about 5.0 hr−1, or between about 5.01 hr−1 and about 35.0 hr−1. To avoid the undesired saturation of a significant amount mono-olefinic hydrocarbons, the mole ratio of hydrogen to multi-olefinic hydrocarbons in the material entering the bed of selective hydrogenation catalyst is maintained between 0.75:1 and 1.8:1. The hydrogenated effluent may exit the reactor 320 in line 324 and enter a hydrogenation separator 326 to provide an overhead stream rich in hydrogen in line 328 that may be compressed and returned back as hydrogen stream 322 after perhaps supplementation with a make-up hydrogen stream. The selectively hydrogenated $C_3$ hydrocarbon stream in the selectively hydrogenated C3 line 330 may be fractionated in a C3 splitter column 332.

The selectively hydrogenated $C_3$ hydrocarbon stream may be further processed in the C3 splitter column 332 to recover a propylene rich product stream in a C3 splitter net overhead line 334 and a propane rich stream in a C3 splitter bottoms line 336. The C3 splitter overhead stream is withdrawn from an overhead of the C3 splitter column 332 in the overhead line 334, condensed in a cooler and fed to a separator. A condensed C3 splitter overhead stream is recycled to the C3 splitter column 332 as reflux through a reflux line and the remaining uncondensed C3 splitter overhead stream is withdrawn through the net C3 splitter overhead line 334 and recovered as propylene monomer product. The C3 splitter overhead stream will be highly concentrated in propylene monomer adequate for a polymerization plant. A propane-rich stream is withdrawn from the C3 splitter column 332 through a C3 splitter bottoms line from which a portion of the bottoms flows through a reboiler line and a reboiler heater and returns heated to the C3 splitter column 332. The remaining portion of the propane-rich bottoms stream flows through the net C3 splitter bottoms line 336 and can be taken as fuel gas or burned upstream such as in the heater 6 or cracking feed in line 300 can be taken from the propane-rich bottoms stream. The C3 splitter column 332 may operate at an overhead pressure of about 400 to about 2500 kPa (gauge), preferably about 1600 to about 1900 kPa (gauge) and a bottoms temperature of about 40° C., to about 60° C.

Turning back to the depropanizer column 240, the $C_{4+}$ hydrocarbons in the depropanizer bottoms stream in the depropanizer net bottoms line 312 may be taken whole as cracking unit feed in line 300. However, a mixed $C_4$'s stream may be recovered in a debutanizer column 340 to be valorized in further processing.

A debutanizer column 340 separates the depropanized bottoms stream in the depropanizer net bottoms line 312 into a debutanizer overhead stream comprising $C_4$-hydrocarbons and a debutanized bottoms stream comprising $C_{5+}$ hydrocarbons. The debutanizer overhead stream is withdrawn from the debutanizer column 340 in a debutanizer overhead line and condensed in a cooler and passed into a separator. A portion of the condensed debutanizer overhead stream is recycled to the debutanizer column 340 as reflux through a reflux line and the remaining portion of the condensed debutanizer overhead stream is withdrawn in line 342 as a debutanizer net overhead stream. The debutanizer net overhead stream is concentrated in mixed $C_4$ hydrocarbons which may be further processed and upgraded in various ways.

The debutanized bottoms stream is withdrawn from the debutanizer column 340 through a bottoms line from which a portion of the debutanized bottoms stream flows through a reboiler line, a reboiler heater and returns to the debutanizer column 340. The remaining portion of the debutanized bottoms flows through a net debutanized bottoms line 344. The net debutanized bottoms stream is rich C5+ hydrocarbons and may be combined with C5+ hydrocarbons in the distillate stripper net bottoms line 354 from the distillate stripper column 228 and used to supplement the cracking unit feed stream in line 300. Hence, the cracking unit feed stream in line 300 is taken at least in part from the liquid pyrolysis product stream in line 57. The debutanizer column 340 operates in a bottoms temperature range of about 140 to about 190° C., preferably about 140 to about 170° C. and an overhead pressure range of about 1.5 to about 1.9 MPa.

The cracking unit feed stream in line 300 comprising crackable hydrocarbons is fed to the cracking unit 220. The cracking unit 220 is in downstream communication with the distillate stripper net bottoms line 354 of the distillate stripper column 350. In the cracking unit 220, $C_{2+}$ hydrocarbons are subjected to steam, hydrogen or catalytic cracking to produce smaller molecules. In steam cracking, $C_{2+}$ hydrocarbons are mixed with steam and subjected to high temperatures to pyrolyze higher hydrocarbons into smaller ethylene and propylene. Steam may be mixed with the feed stream to the steam cracking reactor to reduce the hydrocarbon partial pressure and enhance olefin yield and to reduce the formation and deposition of carbonaceous material in the cracking reactors. The cracking unit 220 is in downstream communication with the high-temperature pyrolysis separator 55, perhaps the low-temperature pyrolysis separator 1440, and the LORP section 210. A cracking effluent stream in line 226 is produced in the cracking unit 220. The cracking effluent stream in line 226 is fed back to the LORP 210 for the recovery of light olefin monomers along with the gaseous pyrolysis product stream in line 102 and the distillate stripper overhead stream in line 228. The LORP section 210 is in downstream communication with the cracking unit 220.

EXAMPLE

We conducted a pyrolysis reaction of HDPE plastic feed at high temperatures. Plastic pellets were dropped through a water-cooled jacketed tube into a heated bed of fluidized alpha-alumina particles to simulate the high-temperature pyrolysis process. Nitrogen gas was used to deliver the plastic pellet to the fluidized bed through the cold tube and to fluidize the bed of heat carrier particles. A nitrogen sweep gas was used to sweep the pyrolyzed plastic gas emitted above the bed around the water-cooled jacket to quench the pyrolysis reaction. Nitrogen sweep gas was not factored into the carbon-to-gas mole ratio calculation since it was not present with the plastic in the fluidized bed during the pyrolysis of the plastic pellet. Gas chromatography was used to determine products of the pyrolysis. The varying pyrolysis conditions and product compositions are shown in the Table.

TABLE

| Run | 10 | 9 | 11 | 12 | 13 | 14 |
|---|---|---|---|---|---|---|
| Reaction Temp., ° C. | 751 | 801 | 827 | 837 | 878 | 895 |
| C/N$_2$ Mole Ratio | 1.8 | 0.9 | 2.7 | 1.2 | 1 | 0.9 |
| Yield, % | | | | | | |
| Hydrogen | 0.70 | 0.71 | 0.95 | 0.95 | 1.02 | 1.41 |
| Methane | 5.09 | 5.21 | 7.24 | 7.21 | 10.21 | 10.66 |
| Ethane | 1.94 | 1.61 | 1.81 | 1.50 | 1.26 | 1.12 |
| Ethylene | 14.28 | 15.54 | 20.22 | 21.04 | 24.71 | 23.16 |
| Propane | 0.48 | 0.48 | 0.42 | 0.31 | 0.18 | 0.00 |
| Propylene | 7.41 | 7.82 | 8.80 | 7.40 | 3.96 | 2.13 |
| MAPD | 0.00 | 0.00 | 0.00 | 0.00 | 0.32 | 0.23 |
| Isobutane | 0.01 | 0.01 | 0.01 | 0.00 | 0.00 | 0.00 |
| n-Butane | 0.00 | 0.00 | 0.00 | 0.00 | 0.15 | 0.12 |

TABLE-continued

| Run | 10 | 9 | 11 | 12 | 13 | 14 |
|---|---|---|---|---|---|---|
| Butenes and Butadiene | 7.09 | 7.36 | 6.23 | 5.12 | 2.75 | 1.73 |
| Isopentane | 0.17 | 0.18 | 0.08 | 0.05 | 0.02 | 0.00 |
| N-Pentane | 0.07 | 0.06 | 0.03 | 0.02 | 0.10 | 0.05 |
| Pentenes | 5.02 | 4.62 | 3.48 | 2.97 | 1.71 | 1.13 |
| C6-C9 | 17.98 | 13.40 | 4.47 | 2.70 | 0.81 | 0.46 |
| Benzene | 8.70 | 8.13 | 13.07 | 13.92 | 16.03 | 17.24 |
| Toluene | 6.91 | 5.06 | 6.53 | 6.18 | 5.28 | 5.09 |
| Ethylbenzene | 1.38 | 0.93 | 0.95 | 0.74 | 0.27 | 0.18 |
| P + M-Xylene | 1.63 | 1.03 | 1.01 | 0.92 | 0.76 | 0.80 |
| O-Xylene | 1.04 | 0.66 | 0.56 | 0.47 | 0.30 | 0.26 |
| Styrene | 3.21 | 3.07 | 5.71 | 6.46 | 7.32 | 9.59 |
| Coke | 7.29 | 13.49 | 8.16 | 8.77 | 15.14 | 13.12 |
| Heavies | 9.62 | 10.65 | 10.26 | 13.29 | 7.70 | 11.53 |

Approximately 40 wt % of the products comprise C2-C4 olefins which are highly valued. Valuable aromatics production is also substantial.

SPECIFIC EMBODIMENTS

While the following is described in conjunction with specific embodiments, it will be understood that this description is intended to illustrate and not limit the scope of the preceding description and the appended claims.

A first embodiment of the invention is a process for converting plastics to monomers comprising heating a plastic feed stream to a temperature of about 300 to about 1100° C. to pyrolyze the plastic feed stream to a pyrolysis product stream including monomers; separating the pyrolysis product stream into a gaseous pyrolysis product stream and a liquid pyrolysis product stream; recovering monomers from the gaseous pyrolysis product stream; and taking a cracking unit feed stream from the liquid pyrolysis product stream; and feeding the cracking unit feed stream to a cracking unit. An embodiment of the invention is one, any or all of prior embodiments in this paragraph up through the first embodiment in this paragraph further comprising producing a cracking effluent stream from the cracking unit and recovering monomers from the cracking effluent stream and the gaseous pyrolysis stream together. An embodiment of the invention is one, any or all of prior embodiments in this paragraph up through the first embodiment in this paragraph further comprising fractionating the liquid pyrolysis product stream to provide a fractionated overhead and a fractionated bottoms stream and taking the cracking unit feed stream from the fractionated bottoms stream. An embodiment of the invention is one, any or all of prior embodiments in this paragraph up through the first embodiment in this paragraph further comprising recovering monomers from the fractionated overhead stream with the gaseous stream pyrolysis product stream. An embodiment of the invention is one, any or all of prior embodiments in this paragraph up through the first embodiment in this paragraph wherein the fractionating is performed in a depentanizer column and further comprising fractionating the fractionated bottom stream in a hexene column to provide a hexene column overhead product comprising 1-hexene and a hexene column bottoms product comprising $nC_{6+}$ hydrocarbons and taking the cracking unit feed stream from the hexene column bottoms product. An embodiment of the invention is one, any or all of prior embodiments in this paragraph up through the first embodiment in this paragraph wherein the heating step is conducted at a temperature of about 600 to about 1100° C. to produce a high-temperature pyrolysis product stream and further comprising quenching the high-temperature pyrolysis product stream to provide the gaseous pyrolysis product stream and the liquid pyrolysis product stream. An embodiment of the invention is one, any or all of prior embodiments in this paragraph up through the first embodiment in this paragraph further comprising compressing the gaseous pyrolysis product stream prior to recovering monomers from it. An embodiment of the invention is one, any or all of prior embodiments in this paragraph up through the first embodiment in this paragraph further comprising fractionating the gaseous pyrolysis product stream, the cracking effluent stream and the gaseous pyrolysis product stream together. An embodiment of the invention is one, any or all of prior embodiments in this paragraph up through the first embodiment in this paragraph further comprising fractionating the gaseous pyrolysis product stream, the cracking effluent stream and the gaseous pyrolysis product stream in a deethanizer column to provide a deethanizer overhead stream and a deethanized bottom stream. An embodiment of the invention is one, any or all of prior embodiments in this paragraph up through the first embodiment in this paragraph further comprising fractionating the deethanizer overhead stream in a demethanizer column and splitting a demethanized bottoms stream to recover ethylene in a C2 splitter column. An embodiment of the invention is one, any or all of prior embodiments in this paragraph up through the first embodiment in this paragraph further comprising fractionating the deethanized bottom stream in a depropanizer column and splitting a depropanizer overhead stream to recover propylene in a C3 splitter column. An embodiment of the invention is one, any or all of prior embodiments in this paragraph up through the first embodiment in this paragraph further comprising fractionating a depropanized bottoms stream in a debutanizer column and feeding a debutanized bottoms stream to a cracking unit with the cracking unit feed stream. An embodiment of the invention is one, any or all of prior embodiments in this paragraph up through the first embodiment in this paragraph further comprising cracking the cracking unit feed stream with a preexisting cracking unit feed stream.

A second embodiment of the invention is an apparatus for pyrolyzing plastics comprising a pyrolysis reactor, a separator in downstream communication with the pyrolysis reactor, a recovery section in downstream communication with the separator and a cracking unit in downstream communication with the separator and the recovery section in downstream communication with the cracking unit. An embodiment of the invention is one, any or all of prior embodiments in this paragraph up through the second embodiment in this paragraph further comprising a distillate stripper column in downstream communication with a bottoms line of the separator and the cracking unit in downstream communication with a bottoms line of the distillate stripper column. An embodiment of the invention is one, any or all of prior embodiments in this paragraph up through the second embodiment in this paragraph further comprising the recovery section in downstream communication with on overhead line of the distillate stripper column.

A third embodiment of the invention is a process for converting plastics to monomers comprising heating a plastic feed stream to a temperature of about 600 to about 1100° C. to pyrolyze the plastic feed stream to a pyrolysis product stream including monomers; separating the pyrolysis product stream into a gaseous pyrolysis product stream and a liquid pyrolysis product stream; recovering monomers from the gaseous pyrolysis product stream; taking a cracking unit feed stream from the liquid pyrolysis product stream; feeding the cracking unit feed stream to a cracking unit to produce a cracking effluent stream; and recovering monomers from the cracking effluent stream and the vapor pyrolysis stream together. An embodiment of the invention is one, any or all of prior embodiments in this paragraph up through the third embodiment in this paragraph further comprising fractionating the liquid pyrolysis product stream to provide a fractionated overhead stream and a fractionated bottoms stream and taking the cracking unit feed stream from the fractionated bottoms stream. An embodiment of the invention is one, any or all of prior embodiments in this paragraph up through the third embodiment in this paragraph further comprising recovering monomers from the fractionated overhead stream with the gaseous pyrolysis product stream. An embodiment of the invention is one, any or all of prior embodiments in this paragraph up through the third embodiment in this paragraph further comprising recovering a debutanized bottoms stream from the fractionated overhead stream and feeding the debutanized bottoms stream to the cracking unit.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for converting plastics to monomers comprising:
   heating a plastic feed stream to a temperature of about 300° C. to about 1100° C. to pyrolyze the plastic feed stream to a pyrolysis product stream including monomers;
   separating said pyrolysis product stream into a gaseous pyrolysis product stream and a liquid pyrolysis product stream;
   taking a cracking unit feed stream from said liquid pyrolysis product stream;
   fractionating said liquid pyrolysis product stream to provide a fractionated overhead stream and a fractionated bottoms stream;
   feeding said cracking unit feed stream to a cracking unit; and
   recovering monomers from said fractionated overhead stream with said gaseous pyrolysis product stream.

2. The process of claim 1 further comprising producing a cracking effluent stream from said cracking unit and recovering monomers from said cracking effluent stream and said gaseous pyrolysis product stream together.

3. The process of claim 2 further comprising taking said cracking unit feed stream from said fractionated bottoms stream.

4. The process of claim 3 wherein said fractionating is performed in a depentanizer column and further comprising fractionating said fractionated bottom stream in a hexene column to provide a hexene column overhead product comprising 1-hexene and a hexene column bottoms product comprising nC6+ hydrocarbons and taking said cracking unit feed stream from said hexene column bottoms product.

5. The process of claim 1 wherein said heating step is conducted at a temperature of about 600° C. to about 1100° C. to produce the pyrolysis product stream and further comprising, in the separating step, quenching said pyrolysis product stream to provide said gaseous pyrolysis product stream and said liquid pyrolysis product stream.

6. The process of claim 5 further comprising compressing said gaseous pyrolysis product stream prior to recovering monomers from it.

7. The process of claim 2 further comprising fractionating said gaseous pyrolysis product stream, said cracking effluent stream and said fractionated overhead stream together.

8. The process of claim 7 further comprising fractionating said gaseous pyrolysis product stream, said cracking effluent stream and said fractionated overhead stream in a deethanizer column to provide a deethanizer overhead stream and a deethanized bottom stream.

9. The process of claim 8 further comprising fractionating the deethanizer overhead stream in a demethanizer column and splitting a demethanized bottoms stream to recover ethylene in a C2 splitter column.

10. The process of claim 8 further comprising fractionating the deethanized bottom stream in a depropanizer column and splitting a depropanizer overhead stream to recover propylene in a C3 splitter column.

11. The process of claim 10 further comprising fractionating a depropanized bottoms stream in a debutanizer column and feeding a debutanized bottoms stream to a cracking unit with said cracking unit feed stream.

12. The process of claim 1 further comprising cracking said cracking unit feed stream with a preexisting cracking unit feed stream.

13. A process for converting plastics to monomers comprising:
   heating a plastic feed stream to a temperature of about 600 to about 1100° C. to pyrolyze the plastic feed stream to a pyrolysis product stream including monomers;
   separating said pyrolysis product stream into a gaseous pyrolysis product stream and a liquid pyrolysis product stream;
   taking a cracking unit feed stream from said liquid pyrolysis product stream;
   fractionating said liquid pyrolysis product stream to provide a fractionated overhead stream and a fractionated bottoms stream;
   feeding said cracking unit feed stream to a cracking unit to produce a cracking effluent stream; and
   recovering monomers from said fractionated overhead stream, said cracking effluent stream and said gaseous pyrolysis product stream together.

14. The process of claim 13 further comprising taking said cracking unit feed stream from said fractionated bottoms stream.

15. The process of claim 13 further comprising recovering a debutanized bottoms stream from said fractionated overhead stream and feeding said debutanized bottoms stream to said cracking unit.

* * * * *